(12) United States Patent
Qualls

(10) Patent No.: US 6,793,712 B2
(45) Date of Patent: Sep. 21, 2004

(54) HEAT INTEGRATION SYSTEM FOR NATURAL GAS LIQUEFACTION

(75) Inventor: Wesley R. Qualls, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 49 days.

(21) Appl. No.: 10/286,270

(22) Filed: Nov. 1, 2002

(65) Prior Publication Data

US 2004/0083888 A1 May 6, 2004

(51) Int. Cl.[7] .............................. B01D 53/14; F25J 1/00
(52) U.S. Cl. .............................. 95/92; 95/172; 95/176; 95/177; 95/192; 95/208; 95/227; 95/228; 95/229; 95/236; 62/611; 62/613; 62/633; 62/634
(58) Field of Search ............................. 95/92, 94, 235, 95/236, 227, 228, 229, 183, 172, 173, 174, 176, 177, 192, 193, 194, 208, 209; 62/632, 633, 634, 618, 619, 611, 612, 613, 614

(56) References Cited

U.S. PATENT DOCUMENTS

| | | | | |
|---|---|---|---|---|
| 3,254,495 A | * | 6/1966 | Jackson et al. | 62/633 |
| 3,724,226 A | | 4/1973 | Pachaly | |
| 3,735,600 A | * | 5/1973 | Dowdell et al. | 62/619 |
| 4,172,711 A | | 10/1979 | Bailey | |
| 4,252,548 A | * | 2/1981 | Markbreiter et al. | 62/632 |
| 4,276,057 A | * | 6/1981 | Becker et al. | 95/174 |
| 4,338,107 A | * | 7/1982 | Swallow | 62/625 |
| 4,456,461 A | * | 6/1984 | Perez | 62/622 |
| 4,775,395 A | * | 10/1988 | Rojey et al. | 95/190 |
| 4,822,393 A | * | 4/1989 | Markbreiter et al. | 62/632 |
| 4,874,525 A | | 10/1989 | Markovs | |
| 5,067,972 A | * | 11/1991 | Hemmings et al. | 95/173 |
| 5,291,736 A | * | 3/1994 | Paradowski | 62/613 |
| 5,325,673 A | | 7/1994 | Durr et al. | |
| 5,611,216 A | * | 3/1997 | Low et al. | 62/612 |
| 5,659,109 A | | 8/1997 | Fernandez de la Vega et al. | |
| 5,669,234 A | | 9/1997 | Houser et al. | |
| 5,868,004 A | * | 2/1999 | Rojey et al. | 62/625 |
| 6,105,390 A | | 8/2000 | Bingham et al. | |
| 6,112,549 A | | 9/2000 | Yao et al. | |
| 6,640,586 B1 | * | 11/2003 | Baudat et al. | 62/612 |
| 2002/0157538 A1 | * | 10/2002 | Foglietta et al. | 95/237 |

* cited by examiner

*Primary Examiner*—Duane S. Smith
(74) *Attorney, Agent, or Firm*—Gary L. Haag

(57) ABSTRACT

A pretreatment system for natural gas liquefaction employing heat integration for more efficient and effective natural gas temperature control. The pretreatment system expands the natural gas prior to acid gas removal. After acid gas removal, the natural gas is cooled by indirect heat exchange with the expanded natural gas located upstream of the acid gas removal system.

52 Claims, 3 Drawing Sheets

HEAT INTEGRATION SYSTEM FOR NATURAL GAS LIQUEFACTION

BACKGROUND OF THE INVENTION

1. Field of the Invention

This invention relates to a method and an apparatus for pretreating natural gas streams entering a liquefied natural gas LNG plant. In another aspect the invention concerns a natural gas pretreatment system that uses process heat integration to control the natural gas temperature during pretreatment and lower the temperature of the natural gas entering the LNG plant.

2. Description of the Prior Art

The cryogenic liquefaction of natural gas is routinely practiced as a means of converting natural gas into a more convenient form for transportation and storage. Such liquefaction reduces the volume by about 600-fold and results in a product which can be stored and transported at near atmospheric pressure.

With regard to ease of storage, natural gas is frequently transported by pipeline from the source of supply to a distant market. It is desirable to operate the pipeline under a substantially constant and high load factor but often the deliverability or capacity of the pipeline will exceed demand while at other times the demand may exceed the deliverability of the pipeline. In order to shave off the peaks where demand exceeds supply or the valleys when supply exceeds demand, it is desirable to store the excess gas in such a manner that it can be delivered when the supply exceeds demand. Such practice allows future demand peaks to be met with material from storage. One practical means for doing this is to convert the gas to a liquefied state for storage and to then vaporize the liquid as demand requires.

The liquefaction of natural gas is of even greater importance when transporting gas from a supply source which is separated by great distances from the candidate market and a pipeline either is not available or is impractical. This is particularly true where transport must be made by ocean-going vessels. Ship transportation in the gaseous state is generally not practical because appreciable pressurization is required to significantly reduce the specific volume of the gas. Such pressurization requires the use of more expensive storage containers.

In order to store and transport natural gas in the liquid state, the natural gas is preferably cooled to −240° F. to −260° F. where the liquefied natural gas (LNG) possesses a near-atmospheric vapor pressure. Numerous systems exist in the prior art for the liquefaction of natural gas in which the gas is liquefied by sequentially passing the gas at an elevated pressure through a plurality of cooling stages whereupon the gas is cooled to successively lower temperatures until the liquefaction temperature is reached. Cooling is generally accomplished by heat exchange with one or more refrigerants such as propane, propylene, ethane, ethylene, methane, nitrogen or combinations of the preceding refrigerants (e.g., mixed refrigerant systems). A liquefaction methodology which is particularly applicable to the current invention employs an open methane cycle for the final refrigeration cycle wherein a pressurized LNG-bearing stream is flashed and the flash vapors (i.e., the flash gas stream(s)) are subsequently employed as cooling agents, recompressed, cooled, combined with the processed natural gas feed stream and liquefied thereby producing the pressurized LNG-bearing stream.

Prior to liquefying a natural gas stream in a LNG plant, the natural gas stream must be pretreated to remove components such as water, acid gases, heavy ($C_3$+) hydrocarbons, and mercury. Such pretreatment is typically accomplished either upstream of all the chilling stages or immediately downstream of an initial chilling stage. It is well known that different pretreatment steps are more effective and efficient at different temperatures and pressures. For example, liquid separation is best accomplished at lower natural gas temperatures while acid gas removal is best accomplished at higher natural gas temperatures. Further, if the temperature of the natural gas stream can be sufficiently lowered during pretreatment, it may be possible to eliminate one or more initial chilling stages of the liquefaction process. Thus, a pretreatment system that more effectively and efficiently controls the temperature of the natural gas throughout pretreatment while lowering the overall temperature of the natural gas during pretreatment would be a significant contribution to the art and to the economy.

OBJECTS AND SUMMARY OF THE INVENTION

It is, therefore, an object of the present invention to provide a novel system for pretreating a natural gas stream entering a natural gas liquefaction plant that provides for more efficient control of the natural gas temperature and pressure.

Another object of the present invention is to provide a novel natural gas pretreatment system utilizing process heat integration to more efficiently and effectively control the temperature of the natural gas during pretreatment.

Still another object of the present invention is to provide a novel natural gas pretreatment system that employs an expander for lowering the pressure of the natural gas stream and for producing energy used elsewhere in the LNG plant.

A further object of the present invention is to provide a novel natural gas pretreatment system wherein the temperature of the natural gas stream exiting the pretreatment system is significantly lower than the temperature of the natural gas stream entering the pretreatment system.

A still further object of the present invention is to provide a natural gas pretreatment system that lowers the pressure of the natural gas in an initial pretreatment step, thereby allowing lower pressure rated equipment to be employed in the pretreatment system.

It should be noted that the above-listed objects and advantages of the invention are exemplary only, and other objects and advantages of the invention will be apparent from the written description and drawings.

Accordingly, in one embodiment of the present invention, there is provided a pretreatment process for natural gas liquefaction comprising the steps of: (a) heating a natural gas stream in a first side of a first heat exchanger; (b) downstream of the first side of the first heat exchanger, heating the natural gas stream in a first side of a second heat exchanger; (c) downstream of the first side of the second heat exchanger, removing an acid gas from the natural gas stream in an acid gas removal system; (d) downstream of the acid gas removal system, cooling the natural gas in a second side of the second heat exchanger by indirect heat exchange with the natural gas stream that is heated in step (b); (e) downstream of the second side of the second heat exchanger, removing water from the natural gas stream in a first dehydrator; and (f) downstream of the first dehydrator, cooling the natural gas stream in a second side of the first heat exchanger by indirect heat exchange with the natural gas that is heated in step (a).

In another embodiment of the present invention, there is provided a pretreatment process for natural gas liquefaction comprising the steps of: (a) reducing the pressure of a natural gas stream in an expander; (b) downstream of the expander, removing liquids from the natural gas in a first gas-liquid separator; and (c) downstream of the first gas-liquid separator, cooling the natural gas stream in a first chiller employing a refrigerant comprising in major portion a hydrocarbon selected from the group consisting of propane, propylene, ethane, ethylene, and combinations thereof.

In still another embodiment of the present invention, there is provided a pretreatment process comprising the steps of: (a) removing water from a natural gas stream in a first dehydrator; (b) downstream of the first dehydrator, reducing the pressure of the natural gas stream in an expander; (c) downstream of the expander, removing liquids from the natural gas stream in a first gas-liquid separator; (d) downstream of the first gas-liquid separator, heating the natural gas stream in a first side of a first heat exchanger; (e) downstream of the first side of the first heat exchanger, heating the natural gas stream in a first side of a second heat exchanger; (f) downstream of the first side of the second heat exchanger, removing an acid gas from the natural gas in an acid gas removal system; (g) downstream the acid gas removal system, cooling the natural gas in a second side of the second heat exchanger; (h) downstream of the second side of the second heat exchanger, removing liquids from the natural gas stream in a second gas-liquid separator; (i) downstream of the second gas-liquid separator, removing water from the natural gas stream in a second dehydrator; and (j) downstream of the second dehydrator, cooling the natural gas stream in a second side of the first heat exchanger.

In a further embodiment of the present invention, there is provided a pretreatment apparatus for natural gas liquefaction. The apparatus comprises an expander, a first heat exchanger, and an acid gas removal system. The expander is operable to reduce the pressure of the natural gas. The first heat exchanger defines a first fluid flow path and a second fluid flow path. The first heat exchanger is operable to facilitate indirect heat exchange between natural gas flowing through the first fluid flow path and natural gas flowing through the second fluid flow path. The inlet of the first fluid flow path is fluidly coupled to the outlet of the expander. The acid gas removal system has an inlet that is fluidly coupled to the outlet of the first flow path. The acid gas removal system has an outlet that is fluidly coupled to the inlet of the second flow path.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1:
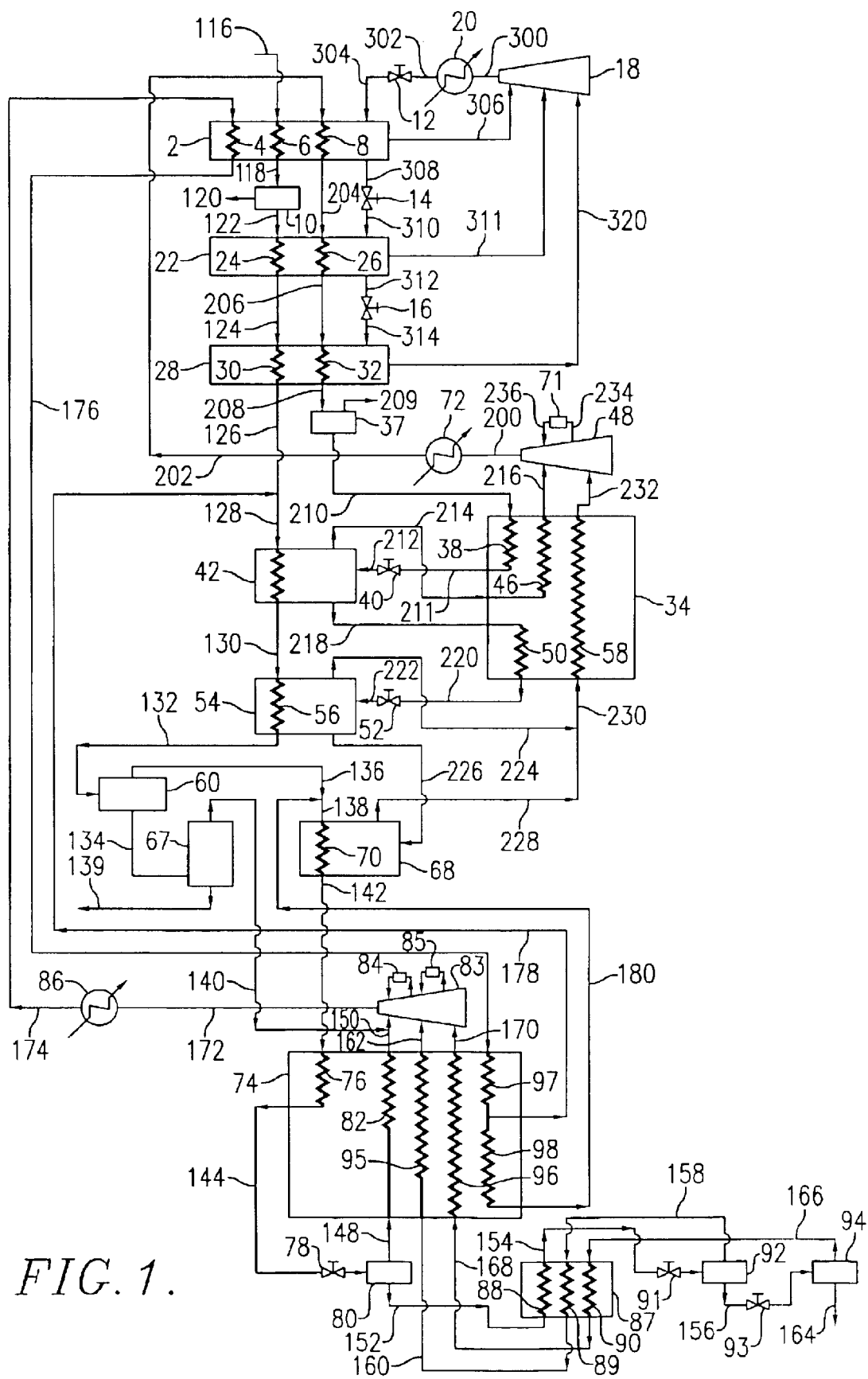
FIG. 1 is a simplified flow diagram of a cascaded refrigeration process for LNG production which employs an open methane refrigeration cycle.

As used herein, the term open-cycle cascaded refrigeration process refers to a cascaded refrigeration process comprising at least one closed refrigeration cycle and one open refrigeration cycle where the boiling point of the refrigerant/cooling agent employed in the open cycle is less than the boiling point of the refrigerating agent or agents employed in the closed cycle(s) and a portion of the cooling duty to condense the compressed open-cycle refrigerant/cooling agent is provided by one or more of the closed cycles. In the current invention, methane or a predominately methane stream is employed as the refrigerant/cooling agent in the open cycle. This stream is comprised of the processed natural gas feed stream and the compressed open methane cycle gas streams.

The design of a cascaded refrigeration process involves a balancing of thermodynamic efficiencies and capital costs. In heat transfer processes, thermodynamic irreversibilities are reduced as the temperature gradients between heating and cooling fluids become smaller, but obtaining such small temperature gradients generally requires significant increases in the amount of heat transfer area, major modifications to various process equipment and the proper selection of flowrates through such equipment so as to ensure that both flowrates and approach and outlet temperatures are compatible with the required heating/cooling duty.

One of the most efficient and effective means of liquefying natural gas is via an optimized cascade-type operation in combination with expansion-type cooling. Such a liquefaction process is comprised of the sequential cooling of a natural gas stream at an elevated pressure, for example about 600 to about 2500 psia, by sequentially cooling the gas stream by passage through a multistage propane cycle, a multistage ethane or ethylene cycle, and an open-end methane cycle which utilizes a portion of the feed gas as a source of methane and which includes therein a multistage expansion cycle to further cool the same and reduce the pressure to near-atmospheric pressure. In the sequence of cooling cycles, the refrigerant having the highest boiling point is utilized first followed by a refrigerant having an intermediate boiling point and finally by a refrigerant having the lowest boiling point. As used herein, the term "propane chiller" shall denote a cooling system that employs a refrigerant having a boiling point the same as, or similar to, that of propane or propylene. As used herein, the term "ethylene chiller" shall denote a cooling system that employs a refrigerant having a boiling point the same as, or similar to, that of ethane or ethylene. As used herein, the terms "upstream" and "downstream" shall be used to describe the relative positions of various components of a natural gas liquefaction plant along the flow path of natural gas through the plant.

Various pretreatment steps provide a means for removing undesirable components, such as acid gases, mercaptans, mercury, moisture, and heavier hydrocarbon condensate from the natural gas feed stream delivered to the facility. The composition of this gas stream may vary significantly. As used herein, a natural gas stream is any stream principally comprised of methane which originates in major portion from a natural gas feed stream, such feed stream for example containing at least 85 mole percent methane, with the balance being ethane, higher hydrocarbons, nitrogen, carbon dioxide and a minor amounts of other contaminants such as mercury, hydrogen sulfide, and mercaptans. The pretreatment steps may be separate steps located either upstream of the cooling cycles or located downstream of one of the early stages of cooling in the initial cycle. The following is a non-inclusive listing of some of the available means which are readily available to one skilled in the art. Acid gases and to a lesser extent mercaptans are routinely removed via a chemical reaction process employing an aqueous aminebearing solution. This treatment step is generally performed upstream of the cooling stages in the initial cycle. A major portion of the water is routinely removed as a liquid via two-phase gas-liquid separation following gas compression and cooling upstream of the initial cooling cycle and also downstream of the first cooling stage in the initial cooling cycle. Mercury is routinely removed via mercury sorbent beds. Residual amounts of water and acid gases are routinely removed via the use of properly selected sorbent beds such as regenerable molecular sieves.

The pretreated natural gas feed stream is generally delivered to the liquefaction process at an elevated pressure or is compressed to an elevated pressure, that being a pressure greater than 500 psia, preferably about 500 psia to about 3000 psia. The stream temperature is typically near ambient to slightly above ambient. A representative temperature range being 60° F. to 140° F.

As previously noted, the natural gas feed stream is cooled in a plurality of multistage (for example, three) cycles or steps by indirect heat exchange with a plurality of refrigerants, preferably three. The overall cooling efficiency for a given cycle improves as the number of stages increases but this increase in efficiency is accompanied by corresponding increases in net capital cost and process complexity. The feed gas is preferably passed through an effective number of refrigeration stages, nominally two, preferably two to four, and more preferably three stages, in the first closed refrigeration cycle utilizing a relatively high boiling refrigerant. Such refrigerant is preferably comprised in major portion of propane, propylene or mixtures thereof, more preferably the refrigerant comprises at least about 75 mole percent propane, still more preferably at least 90 mole percent propane, and most preferably the refrigerant consists essentially of propane. Thereafter, the processed feed gas flows through an effective number of stages, nominally two, preferably two to four, and more preferably two or three, in a second closed refrigeration cycle in heat exchange with a refrigerant having a lower boiling point. Such refrigerant is preferably comprised in major portion of ethane, ethylene or mixtures thereof, more preferably the refrigerant comprises at least about 75 mole percent ethylene, more preferably at least 90 mole percent ethylene, and most preferably the refrigerant consists essentially of ethylene. Each cooling stage comprises a separate cooling zone. As previously noted, the processed natural gas feed stream is combined with one or more recycle streams (i.e., compressed open methane cycle gas streams) at various locations in the second cycle thereby producing a liquefaction stream. In the last stage of the second cooling cycle, the liquefaction stream is condensed (i.e., liquefied) in major portion, preferably in its entirety thereby producing a pressurized LNG-bearing stream. Generally, the process pressure at this location is only slightly lower than the pressure of the pretreated feed gas to the first stage of the first cycle.

Generally, the natural gas feed stream will contain such quantities of $C_2+$ components so as to result in the formation of a $C_2+$ rich liquid in one or more of the cooling stages. This liquid is removed via gas-liquid separation means, preferably one or more conventional gas-liquid separators. Generally, the sequential cooling of the natural gas in each stage is controlled so as to remove as much as possible of the $C_2$ and higher molecular weight hydrocarbons from the gas to produce a gas stream predominating in methane and a liquid stream containing significant amounts of ethane and heavier components. An effective number of gas/liquid separation means are located at strategic locations downstream of the cooling zones for the removal of liquids streams rich in $C_2+$ components. The exact locations and number of gas/liquid separation means, preferably conventional gas/liquid separators, will be dependant on a number of operating parameters, such as the $C_2+$ composition of the natural gas feed stream, the desired BTU content of the LNG product, the value of the $C_2+$ components for other applications and other factors routinely considered by those skilled in the art of LNG plant and gas plant operation. The $C_2+$ hydrocarbon stream or streams may be demethanized via a single stage flash or a fractionation column. In the latter case, the resulting methane-rich stream can be directly returned at pressure to the liquefaction process. In the former case, this methane-rich stream can be repressurized and recycle or can be used as fuel gas. The $C_2+$ hydrocarbon stream or streams or the demethanized $C_2+$ hydrocarbon stream may be used as fuel or may be further processed such as by fractionation in one or more fractionation zones to produce individual streams rich in specific chemical constituents (ex., $C_2$, $C_3$, $C_4$ and $C_5+$).

The pressurized LNG-bearing stream is then further cooled in a third cycle or step referred to as the open methane cycle via contact in a main methane economizer with flash gases (i.e., flash gas streams) generated in this third cycle in a manner to be described later and via expansion of the pressurized LNG-bearing stream to near atmospheric pressure. Flashing of the pressurized LNG-bearing stream, preferably a liquid stream, to near atmospheric pressure produces an LNG product possessing a temperature of −240° F. to −260° F. The flash gases used as a refrigerant in the third refrigeration cycle are preferably comprised in major portion of methane, more preferably the refrigerant comprises at least about 75 mole percent methane, still more preferably at least 90 mole percent methane, and most preferably the refrigerant consists essentially of methane. During expansion of the pressurized LNG-bearing stream to near atmospheric pressure, the pressurized LNG-bearing stream is cooled via at least one, preferably two to four, and more preferably three expansions where each expansion employs as a pressure reduction means either Joule-Thomson expansion valves or hydraulic expanders. The expansion is followed by a separation of the gas-liquid product with a separator. When a hydraulic expander is employed and properly operated, the greater efficiencies associated with the recovery of power, a greater reduction in stream temperature, and the production of less vapor during the flash step will frequently more than off-set the more expensive capital and operating costs associated with the expander. In one embodiment, additional cooling of the pressurized LNG-bearing stream prior to flashing is made possible by first flashing a portion of this stream via one or more hydraulic expanders and then via indirect heat exchange means employing said flash gas stream to cool the remaining portion of the pressurized LNG-bearing stream prior to flashing. The warmed flash gas stream is then recycled via return to an appropriate location, based on temperature and pressure considerations, in the open methane cycle and will be recompressed.

Critical to the liquefaction of natural gas in a cascaded process is the use of one or more refrigerants for transferring heat energy from the natural gas stream to the refrigerant and ultimately transferring said heat energy to the environment. In essence, the overall refrigeration system functions as a heat pump by removing heat energy from the natural gas stream as the stream is progressively cooled to lower and lower temperatures.

The liquefaction process may use one of several types of cooling which include but is not limited to (a) indirect heat exchange, (b) vaporization, and (c) expansion or pressure reduction. Indirect heat exchange, as used herein, refers to a process wherein the refrigerant cools the substance to be cooled without actual physical contact between the refrigerating agent and the substance to be cooled. Specific examples of indirect heat exchange means include heat exchange undergone in a shell-and-tube heat exchanger, a core-in-kettle heat exchanger, and a brazed aluminum plate-fin heat exchanger. The physical state of the refrigerant and substance to be cooled can vary depending on the demands of the system and the type of heat exchanger chosen. Thus, a shell-and-tube heat exchanger will typically be utilized where the refrigerating agent is in a liquid state and the substance to be cooled is in a liquid or gaseous state or when one of the substances undergoes a phase change and process conditions do not favor the use of a core-in-kettle heat exchanger. As an example, aluminum and aluminum alloys are preferred materials of construction for the core but such materials may not be suitable for use at the designated process conditions. A plate-fin heat exchanger will typically be utilized where the refrigerant is in a gaseous state and the substance to be cooled is in a liquid or gaseous state. Finally, the core-in-kettle heat exchanger will typically be utilized where the substance to be cooled is liquid or gas and the refrigerant undergoes a phase change from a liquid state to a gaseous state during the heat exchange.

Vaporization cooling refers to the cooling of a substance by the evaporation or vaporization of a portion of the substance with the system maintained at a constant pressure. Thus, during the vaporization, the portion of the substance which evaporates absorbs heat from the portion of the substance which remains in a liquid state and hence, cools the liquid portion.

Finally, expansion or pressure reduction cooling refers to cooling which occurs when the pressure of a gas, liquid or a two-phase system is decreased by passing through a pressure reduction means. In one embodiment, this expansion means is a Joule-Thomson expansion valve. In another embodiment, the expansion means is either a hydraulic or gas expander. Because expanders recover work energy from the expansion process, lower process stream temperatures are possible upon expansion.

Figure 2:
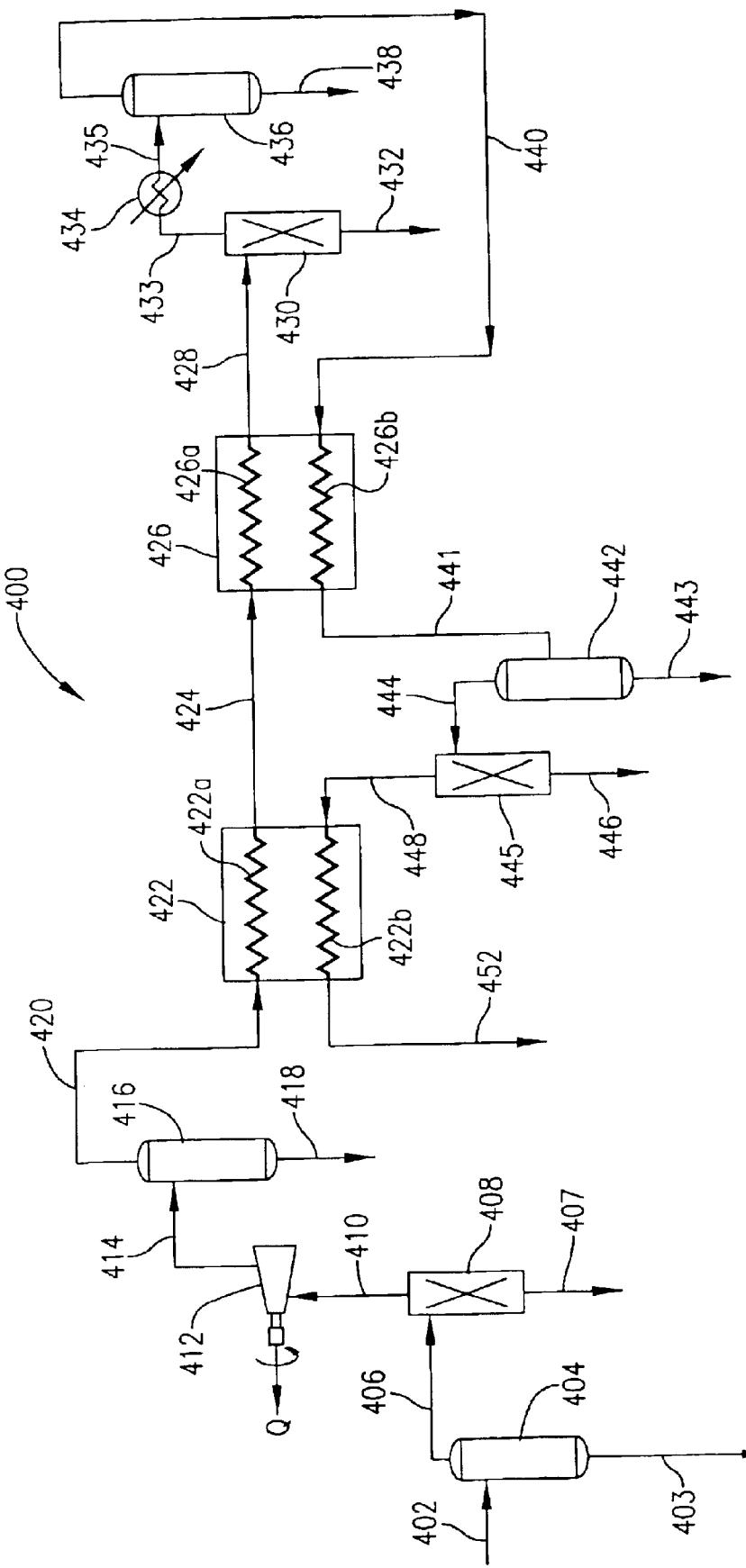
FIG. 2 is a simplified flow diagram of a preferred embodiment of the natural gas pretreatment system suitable for use in the natural gas liquefaction plant illustrated in FIG. 1.

The flow schematic and apparatus set forth in FIG. 1 is a preferred embodiment of the open-cycle cascaded liquefaction process and is set forth for illustrative purposes. Purposely omitted from this embodiment is a pretreatment system because the location of such system in the liquefaction plant can vary depending on various feed and operating parameters. FIG. 2 generally depicts a natural gas pretreatment system suitable for use in the cascade liquefaction process of FIG. 1. The ensuing discussion will address the integration of the process methodologies and associated apparatus depicted in FIG. 2 into the process methodology and apparatus depicted in FIG. 1. Those skilled in the art will recognize that FIGS. 1 and 2 are schematics only and therefore, many items of equipment that would be needed in a commercial plant for successful operation have been omitted for the sake of clarity. Such items might include, for example, compressor controls, flow and level measurements and corresponding controllers, temperature and pressure controls, pumps, motors, filters, additional heat exchangers, and valves, etc. These items would be provided in accordance with standard engineering practice.

To facilitate an understanding of FIGS. 1 and 2, the following numbering nomenclature was employed. Items numbered 1 thru 99 are process vessels and equipment depicted in FIG. 1 which are directly associated with the liquefaction process excluding items directly associated with nitrogen removal. Items numbered 100 thru 199 correspond to flow lines or conduits depicted in FIG. 1 which contain methane in major portion. Items numbered 200 thru 299 correspond to flow lines or conduits depicted in FIG. 1 which contain the refrigerant ethylene. Items numbered 300–399 correspond to flow lines or conduits depicted in FIG. 1 which contain the refrigerant propane. Items number 400–499 correspond to process vessels, equipment, and flow lines or conduits depicted in FIG. 2.

Referring to FIG. 1, a natural gas feed stream, as previously described, enters conduit 116 from a natural gas pipeline for cooling via a first refrigeration cycle. As part of the first refrigeration cycle, gaseous propane is compressed in a multistage compressor 18 driven by a gas turbine driver which is not illustrated. The three compression stages preferably form a single unit although they may be separate units mechanically coupled together to be driven by a single driver. Upon compression, the compressed propane is passed through conduit 300 to a cooler 20 where it is liquefied. A representative pressure and temperature of the liquefied propane refrigerant prior to flashing is about 116° F. and about 190 psia. Although not illustrated in FIG. 1, it is preferable that a separation vessel be located downstream of cooler 20 and upstream of an expansion valve 12 for the removal of residual light components from the liquefied propane. Such vessels may be comprised of a single-stage gas liquid separator or may be more sophisticated and comprised of an accumulator section, a condenser section and an absorber section, the latter two of which may be continuously operated or periodically brought on-line for removing residual light components from the propane. The stream from this vessel or the stream from cooler 20, as the case may be, is pass through conduit 302 to a pressure reduction means, such as expansion valve 12, wherein the pressure of the liquefied propane is reduced thereby evaporating or flashing a portion thereof. The resulting two-phase product then flows through conduit 304 into a high-stage propane chiller 2 for indirect heat exchange with gaseous methane refrigerant introduced via conduit 174, natural gas feed introduced via conduit 116, and gaseous ethylene refrigerant introduced via conduit 202 via indirect heat exchange means 4, 6 and 8, thereby producing cooled gas streams respectively transported via conduits 176, 118, and 204.

The flashed propane gas from chiller 2 is returned to compressor 18 through conduit 306. This gas is fed to the high stage inlet port of compressor 18. The remaining liquid propane is passed through conduit 308, the pressure further reduced by passage through a pressure reduction means, illustrated as expansion valve 14, whereupon an additional portion of the liquefied propane is flashed. The resulting two-phase stream is then fed to an intermediate-stage propane chiller 22 through conduit 310 thereby providing a coolant for chiller 22.

The cooled natural gas feed stream from high-stage propane chiller 2 flows via conduit 118 to a knock-out vessel 10 wherein gas and liquid phases are separated. The liquid phase which is rich in $C_3+$ components is removed via conduit 120. The gaseous phase is removed via conduit 122 and conveyed to propane chiller 22. Ethylene refrigerant is introduced to chiller 22 via conduit 204. In the chiller, the processed natural gas stream and an ethylene refrigerant stream are respectively cooled via indirect heat exchange means 24 and 26 thereby producing a cooled processed natural gas stream and an ethylene refrigerant stream via conduits 124 and 206. The thus evaporated portion of the propane refrigerant is separated and passed through conduit 311 to the intermediate-stage inlet of compressor 18. Liquid propane is passed through conduit 312, the pressure further reduced by passage through a pressure reduction means, illustrated as expansion valve 16, whereupon an additional portion of liquefied propane is flashed. The resulting two-phase stream is then fed to a low-stage propane chiller/condenser 28 through conduit 314 thereby providing coolant to chiller 28.

As illustrated in FIG. 1, the cooled processed natural gas stream flows from the intermediate-stage propane chiller 22 to the low-stage propane chiller/condenser 28 via conduit 124. In chiller/condenser 28, the stream is cooled via indirect heat exchange means 30. In a like manner, the ethylene refrigerant stream flows from intermediate-stage propane chiller 22 to low-stage propane chiller/condenser 28 via conduit 206. In the latter, the ethylene-refrigerant is condensed via an indirect heat exchange means 32 in nearly its entirety. The vaporized propane is removed from the low-stage propane chiller/condenser 28 and returned to the low-stage inlet at compressor 18 via conduit 320. Although FIG. 1 illustrates cooling of streams provided by conduits 124 and 206 to occur in the same vessel, the chilling of stream 124 and the cooling and condensing of stream 206 may respectively take place in separate process vessels (ex., a separate chiller and a separate condenser, respectively).

As illustrated in FIG. 1, a portion of the cooled compressed open methane cycle gas stream is provided via conduit 178, combined with the processed natural gas feed stream exiting low-stage propane chiller 28 via conduit 126 thereby forming a liquefaction stream and this stream is then introduced to a high-stage ethylene chiller 42 via conduit 128. Ethylene refrigerant exits low-stage propane chiller 28 via conduit 208 and is fed to a separation vessel 37 wherein light components are removed via conduit 209 and condensed ethylene is removed via conduit 210. The separation vessel is analogous to the earlier discussed for the removal of light components from liquefied propane refrigerant and may be a single-stage gas/liquid separator or may be a multiple stage operation resulting in a greater selectivity of the light components removed from the system. The ethylene refrigerant at this location in the process is generally at a temperature of about −24° F. and a pressure of about 285 psia. The ethylene refrigerant via conduit 210 then flows to a main ethylene economizer 34 wherein it is cooled via indirect heat exchange means 38 and removed via conduit 211 and passed to a pressure reduction means such as an expansion valve 40 whereupon the refrigerant is flashed to a preselected temperature and pressure and fed to high-stage ethylene chiller 42 via conduit 212. Vapor is removed from chiller 42 via conduit 214 and routed to main ethylene economizer 34 wherein the vapor functions as a coolant via indirect heat exchange means 46. The ethylene vapor is then removed from ethylene economizer 34 via conduit 216 and feed to the high-stage inlet of an ethylene compressor 48. The ethylene refrigerant which is not vaporized in high-stage ethylene chiller 42 is removed via conduit 218 and returned to ethylene main economizer 34 for further cooling via indirect heat exchange means 50, removed from the main ethylene economizer via conduit 220 and flashed in a pressure reduction means illustrated as expansion valve 52 whereupon the resulting two-phase product is introduced into a low-stage ethylene chiller 54 via conduit 222. The liquefaction stream is removed from high-stage ethylene chiller 42 via conduit 130 and directly fed to a low-stage ethylene chiller 54 wherein it undergoes additional cooling and partial condensation via indirect heat exchange means 56. The resulting two-phase stream then flows via conduit 132 to a two phase separator 60 from which is produced a methane-rich vapor stream via conduit 136 and via conduit 134, a liquid stream rich in $C_2$+ components which is subsequently flashed or fractionated in vessel 67 thereby producing via conduit 139 a heavies stream and a second methane-rich stream which is transferred via conduit 140 and after combination with a second stream via conduit 150 is fed to the high pressure inlet port on the methane compressor 83.

The stream in conduit 136 and a cooled compressed open methane cycle gas stream provided via conduit 180 are combined and fed via conduit 138 to a low-stage ethylene condenser 68 wherein this stream exchanges heat via indirect heat exchange means 70 with the liquid effluent from the low-stage ethylene chiller 54 which is routed to low-stage ethylene condenser 68 via conduit 226. In condenser 68, the combined streams are condensed and produced from condenser 68 via conduit 142 is a pressurized LNG-bearing stream. The vapor from the low-stage ethylene chiller 54 via conduit 224 and low-stage ethylene condenser 68 via conduit 228 are combined and routed via conduit 230 to main ethylene economizer 34 wherein the vapors function as a coolant via indirect heat exchange means 58. The stream is then routed via conduit 232 from main ethylene economizer 34 to the low-stage inlet port of ethylene compressor 48. As noted in FIG. 1, the compressor effluent from vapor introduced via the low-stage inlet port is removed via conduit 234, cooled via inter-stage cooler 71 and returned to compressor 48 via conduit 236 for injection with the high-stage stream present in conduit 216. Preferably, the two-stages of compression are a single module although they may each be a separate module and the modules mechanically coupled to a common driver. The compressed ethylene product from the compressor is routed to a downstream cooler 72 via conduit 200. The product from the cooler flows via conduit 202 and is introduced, as previously discussed, to high-stage propane chiller 2.

The pressurized LNG-bearing stream, preferably a liquid stream in its entirety, in conduit 142 is generally at a temperature of about −125° F. and about 615 psia. This stream passes via conduit 142 through a main methane economizer 74 wherein the stream is further cooled by indirect heat exchange means 76 as hereinafter explained. From main methane economizer 74 the pressurized LNG-bearing stream passes through conduit 144 and its pressure is reduced by a pressure reductions means, illustrated as expansion valve 78, which evaporates or flashes a portion of the gas stream thereby generating a flash gas stream. The flashed stream is then passed to methane high-stage flash drum 80 where it is separated into a flash gas stream discharged through conduit 148 and a liquid phase stream (i.e., pressurized LNG-bearing stream) discharged through conduit 152. The flash gas stream is then transferred to main methane economizer 74 via conduit 148 wherein the stream functions as a coolant via indirect heat exchange means 82. The flash gas stream (i.e., warmed flash gas stream) exits main methane economizer 74 via conduit 150 where it is combined with a gas stream delivered by conduit 140. These streams are then fed to the low pressure side of the high pressure stage of compressor 83. The liquid phase in conduit 152 is passed through a second methane economizer 87 wherein the liquid is further cooled via indirect heat exchange means 88 by a downstream flash gas stream. The cooled liquid exits second methane economizer 87 via conduit 154 and is expanded or flashed via pressure reduction means, illustrated as expansion valve 91, to further reduce the pressure and at the same time, evaporate a second portion thereof. This flash gas stream is then passed to intermediate-stage methane flash drum 92 where the stream is separated into a flash gas stream passing through conduit 158 and a liquid phase stream passing through conduit 156. The flash gas stream flows through conduit 158 to second methane economizer 87 wherein the gas cools the liquid introduced to 87 via conduit 152 via indirect heat exchanger means 89. Conduit 160 serves as a flow conduit between indirect heat exchange means 89 in second methane economizer 87 and the indirect heat exchange means 95 in main methane economizer 74. The warmed flash gas stream leaves main methane economizer 74 via conduit 162 which is connected to the inlet to the intermediate-stage inlet port of methane compressor 83. The liquid phase exiting intermediate stage flash drum 92 via conduit 156 is further reduced in pressure, preferably to about 25 psia, by passage through a pressure reduction means illustrated as expansion valve 93. Again, a third portion of the liquefied gas is evaporated or flashed. The fluids from expansion valve 93 are passed to final or low stage flash drum 94. In flash drum 94, a vapor phase is separated as a flash gas stream and passed through conduit 166 to second methane economizer 87 wherein the flash gas stream functions as a coolant via indirect heat exchange means 90, exits second methane economizer 87 via conduit 168 which is connected to main methane economizer 74 wherein the flash gas stream functions as a coolant via indirect heat exchange means 96 and ultimately leaves main methane economizer 70 via conduit 170 which is connected to the low-stage inlet port of methane compressor 83. The liquefied natural gas product (i.e., the LNG stream) from flash drum 94 which is at approximately atmospheric pressure is passed through conduit 164 to the storage unit. The low pressure, low temperature LNG boil-off vapor stream from the storage unit is preferably recovered by combining such stream with the low pressure flash gases present in either conduits 166, 168, or 170; the selected conduit being based on a desire to match gas stream temperatures as closely as possible. In accordance with conventional practice, the liquefied natural gas (LNG) in the storage unit can be transported to a desired location (typically via an ocean-going LNG tanker). The LNG can then be vaporized at an onshore LNG terminal for transport in the gaseous state via conventional natural gas pipelines.

As shown in FIG. 1, the high, intermediate and low stages of compressor 83 are preferably combined as single unit. However, each stage may exist as a separate unit where the units are mechanically coupled together to be driven by a single driver. The compressed gas from the low-stage section passes through an inter-stage cooler 85 and is combined with the intermediate pressure gas in conduit 162 prior to the second-stage of compression. The compressed gas from the intermediate stage of compressor 83 is passed through an inter-stage cooler 84 and is combined with the high pressure gas provided via conduits 140 and 150 prior to the third-stage of compression. The compressed gas (i.e., compressed open methane cycle gas stream) is discharged from high stage methane compressor through conduit 172, is cooled in cooler 86 and is routed to high-stage propane chiller 2 via conduit 174 as previously discussed. The stream is cooled in chiller 2 via indirect heat exchange means 4 and flows to main methane economizer 74 via conduit 176. As used herein and previously noted, compressor also refers to each stage of compression and any equipment associated with interstage cooling.

As illustrated in FIG. 1, the compressed open methane cycle gas stream from chiller 2 which enters main methane economizer 74 undergoes cooling in its entirety via flow through indirect heat exchange means 97. A portion of this cooled stream is then removed via conduit 178 and combined with the processed natural gas feed stream upstream of high-stage ethylene chiller 42. The remaining portion of this cooled stream undergoes further cooling via indirect heat transfer mean 98 in main methane economizer 74 and is produced therefrom via conduit 180. This stream is combined with the above cited combined stream at a location upstream of ethylene condenser 68 and this liquefaction stream then undergoes liquefaction in major portion in the ethylene condenser 68 via flow through indirect heat exchange means 70.

Referring now to FIGS. 1 and 2 in combination, natural gas pretreatment system 400 (shown in FIG. 2) can be integrated into the natural gas liquefaction system (shown in FIG. 1) at several locations. In one configuration, an inlet conduit 402 and an outlet conduit 452 of pretreatment system 400 can be fluidly disposed in conduit 116 so that pretreatment system 400 is disposed upstream of high-stage propane chiller 2. Alternatively, pretreatment system 400 can be disposed downstream of high-stage propane chiller 2 and upstream of intermediate-stage propane chiller 22. Preferably, pretreatment system 400 provides sufficient cooling of the natural gas stream so that chiller 2 can be entirely eliminated. In the case where chiller 2 is entirely eliminated, pretreatment system 400 is disposed immediately upstream of chiller 22, with conduit 452 of pretreatment system 400 being fluidly coupled to conduit 122 leading to chiller 22.

Referring to FIG. 2, a natural gas stream enters pretreatment system 400 via conduit 402 which carries the natural gas to a gas-liquid separator 404. The liquid effluent from separator 404 exits pretreatment system 400 via conduit 403, while the gaseous effluent (primarily natural gas) is conducted to a dehydrator 408 via conduit 406. Dehydrator 408 can be any suitable device known in the art that is capable of removing water from natural gas. Preferably, dehydrator 408 is a glycol dehydrator. In dehydrator 408, water is removed from the natural gas and the removed water exits pretreatment system 400 via conduit 407. The resulting dehydrated natural gas is transported from dehydrator 408 to an expander 412 via conduit 410. Expander 412 can be any device known in the art that is suitable to reduce the pressure of a fluid flowing therethrough. Preferably, energy in the form of mechanical energy, thermal energy, or hydraulic energy can be extracted from expander 412 as expander 412 is used to reduce the pressure of the natural gas stream. Most preferably, expander 412 is a turbo expander from which mechanical energy can be extracted and employed downstream in the natural gas liquefaction system illustrated in FIG. 1. In expander 412 it is preferred for both the temperature and pressure of the natural gas to be reduced, thereby causing condensation of propane and heavier hydrocarbons. The cooled and pressure-reduced natural gas exits expander 412 and flows to a gas-liquid separator 416 via conduit 414. In gas-liquid separator 416 the condensed liquids are separated from the natural gas, with the condensed liquids exiting pretreatment system 400 via conduit 418.

After liquid removal in separator 416, the substantially liquid free natural gas exits gas-liquid separator 416 via conduit 420 and flows to indirect heat exchanger 422. Heat exchanger 422 includes a first side 422a and a second side 422b. First and second sides 422a,b of heat exchanger 422 are fluidly isolated from one another and are operable to facilitate the transfer of heat between a fluid flowing through first side 422a and a fluid flowing through second side 422b. In first side 422a, the natural gas is heated by indirect heat exchange with a hot natural gas stream flowing through second side 422b. After being heated in first side 422a of heat exchanger 422, the natural gas stream is then conducted to a first side 426a of another heat exchanger 426. In first side 426a, the natural gas stream is further heated by indirect heat exchange with a hot natural gas stream flowing through a second side 426b of heat exchanger 426. Heat exchangers 422, 426 can be any suitable heat exchange means known in the art for facilitating indirect heat exchange between two fluids flowing therethrough such as, for example, tube-in-shell heat exchangers or plate-fin heat exchangers. However, aluminum plate-fin heat exchangers should only be used if there is no mercury present in the feed.

After being heated in first side 426a of heat exchanger 426, the natural gas stream is conducted to an acid gas removal system 430 via conduit 428. Acid gas removal system 430 is operable to remove acid gases such as hydrogen sulfide ($H_2S$) and carbon dioxide ($CO_2$) from the natural gas. Preferably, acid gas removal system 430 employs an amine solvent to remove $CO_2$ down to less than 50 ppmv and $H_2S$ down to less than 2 ppmv. The reaction(s) taking place in acid gas removal system 430 causes heating of the natural gas in acid gas removal system 430.

After acid gas removal, the natural gas is conducted from acid gas removal system 430 to a cooler 434 via conduit 433. In cooler 434 the temperature of the acid gas is reduced by any means known in the art, preferably by indirect heat exchange with air or cooling water. The cooled natural gas stream exiting cooler 434 is then conducted to a gas-liquid separator 436 via conduit 435. The separated liquid from separator 436 exits pretreatment system 400 via conduit 438. A substantially liquid free natural gas stream exits separator 436 via conduit 440 for transport to second side 426b of heat exchanger 426. In second side 426b, the natural gas stream is cooled by indirect heat exchange with the natural gas stream flowing through first side 426a. It is preferred for the natural gas stream to be cooled in second side 426b to a temperature that is near the hydrate temperature of the natural gas stream at that location. Preferably, the natural gas stream is cooled to a temperature in the range of from about 1 to about 20 degrees F. greater than the hydrate temperature, most preferably from 2 to 10 degrees greater than the hydrate temperature. As used herein, the term "hydrate temperature" shall denote a temperature at which water contained in a fluid stream begins to freeze. The cooled natural gas stream exiting second side 426b is conducted to a gas-liquid separator 442 via conduit 441. The separated liquid from separator 442 exits pretreatment system 400 via conduit 443. The natural gas stream exiting separator 442 is conducted to a dehydrator 445 via conduit 444. Dehydrator 445 can be any suitable device known in the art that is capable of removing water from natural gas. Preferably, dehydrator 445 employs a molecular sieve to remove water from the natural gas stream. The removed water from dehydrator 445 exits pretreatment system 400 via conduit 446. The dehydrated natural gas stream exiting dehydrator 445 is conducted to second side 422b of heat exchanger 422 via conduit 448. In second side 422b, the natural gas stream is cooled by indirect heat exchange with the natural gas stream flowing through first side 422a. It is preferred for the natural gas stream to be cooled in second side 422b to a temperature that is less than the hydrate temperature of the natural gas stream exiting second side 426b. The cooled natural gas exits second side 422b via conduit 452 and is then transported downstream for further cooling and liquefaction in the LNG plant.

Although the temperature and pressure of the natural gas stream at various points throughout pretreatment system 400 can vary greatly depending upon feed composition and operating parameters, Table 1, below, provides preferred ranges of temperatures and pressures of the natural gas stream throughout pretreatment system 400.

TABLE 1

| Conduit Number | Preferred Range | | Most Preferred Range | |
|---|---|---|---|---|
| | Temp (° F.) | Press (psia) | Temp (° F.) | Press (psia) |
| 402 | 25–100 | 1000–3000 | 60–80 | 1750–2250 |
| 406 | 25–100 | 1000–3000 | 60–80 | 1750–2250 |
| 410 | 25–100 | 1000–3000 | 65–85 | 1750–2250 |
| 414 | 10–60 | 500–200 | 20–40 | 1000–1500 |
| 420 | 10–60 | 500–200 | 25–45 | 1000–1500 |
| 424 | 25–100 | 500–200 | 55–75 | 1000–1500 |
| 428 | 50–140 | 500–200 | 80–100 | 1000–1500 |
| 433 | 50–140 | 500–200 | 100–120 | 1000–1500 |
| 435 | 50–140 | 500–200 | 90–110 | 1000–1500 |
| 440 | 50–140 | 500–200 | 90–110 | 1000–1500 |
| 441 | 25–100 | 500–200 | 65–85 | 1000–1500 |
| 444 | 25–100 | 500–200 | 65–85 | 1000–1500 |
| 448 | 25–100 | 500–200 | 65–85 | 1000–1500 |
| 452 | 15–80 | 500–200 | 35–55 | 1000–1500 |

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

EXAMPLE

Figure 3:
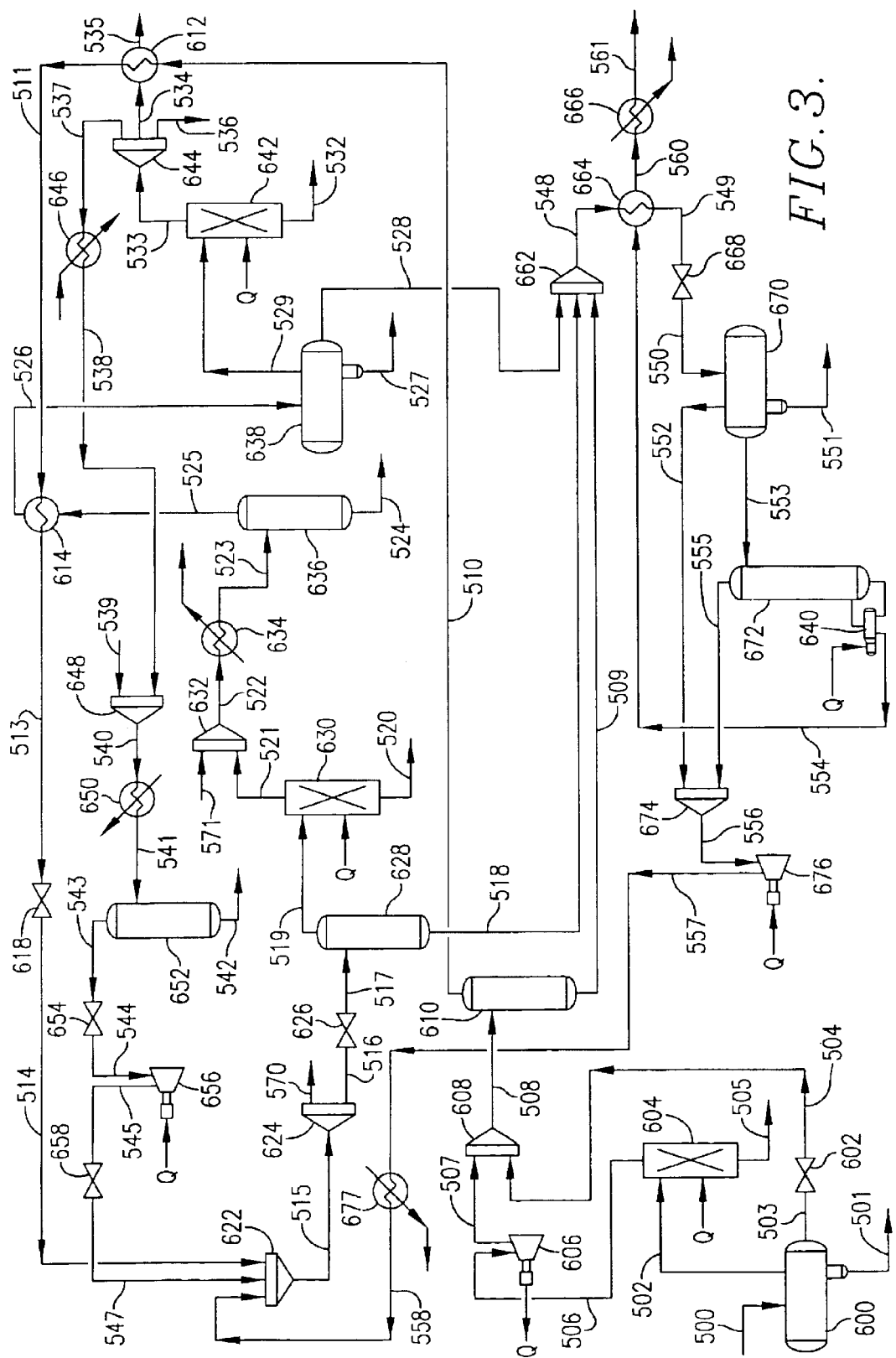
FIG. 3 is a flow diagram of a simulated natural gas pretreatment system designed in accordance with the principles of the present invention.

This example describes a computer simulation of a natural gas pretreatment system designed in accordance with the principles of the present invention. The computer simulation was generated using HYSYS ver. 2.2.2 process modeling software available from Hyprotech, Calgary, Alberta, Canada. FIG. 3 illustrates the major components and fluid-carrying lines of the simulated pretreatment system, while Table 2, below, provides simulated temperature, pressure, and composition information for the fluid streams in the various lines depicted in FIG. 3.

Referring to FIG. 3, natural gas enters the pretreatment system through conduit 500 and flows into a three phase separator 600. Although a three phase separator 600 is used for modeling purposes, two vessels (i.e., a slug catcher and a two phase separator) would likely be employed in practice. Three phase separator 600 is operable to remove hydrocarbon condensate and any aqueous components from the inlet gas stream, thereby producing an aqueous stream, a gaseous hydrocarbon stream, and a liquid hydrocarbon or condensate stream. Conduit 501 carries the aqueous stream from three phase separator 600 to waste water treatment or disposal. Conduit 502 carries the gaseous hydrocarbon stream from three phase separator 600 to a glycol dehydrator 604. Conduit 503 carries the liquid hydrocarbon or condensate stream to a valve 602. Valve 602 controls the flow of the liquid hydrocarbon or condensate stream to a mixing means 608 via conduit 504.

Dehydrator 604 is operable to remove water from the natural gas stream and thereby produce a removed water stream via conduit 505 and a dehydrated natural gas stream via conduit 506. The dehydrated natural gas stream in conduit 506 is carried to a turbo expander 606 for pressure reduction. Turbo expander 606 is operable to produce work (Q) while reducing the pressure and temperature of the natural gas stream. From expander 606 the natural gas flows via conduit 507 to mixing means 608 for combination with the liquid hydrocarbon or condensate stream in conduit 504. From mixing means 608 the natural gas stream flows via conduit 508 to a gas-liquid separator 610. Separator 610 is operable to separate condensed liquid components from the natural gas. The condensed liquids are removed from separator 610 via conduit 509, while the gaseous natural gas stream exits separator via conduit 510. The natural gas stream in conduit 510 is transported to a first indirect heat exchanger 612, wherein it is heated by indirect heat exchange with hot downstream natural gas in conduit 534. The heated natural gas stream flows from first indirect heat exchanger 612 to a second indirect heat exchanger 614 via conduit 511. In second heat exchanger 614 the natural gas is heated by indirect heat exchange with hot downstream natural gas in conduit 525.

The heated natural gas stream from second heat exchanger 614 flows via conduit 513 to valve 618 and then to mixing means 622 via conduit 514. In mixing means 622 the natural gas stream in conduit 514 is combined with natural gas from conduit 547 and conduit 558. The combined natural gas stream from mixing means 622 flows to a tee 624 where the natural gas stream can be divided into streams flowing through conduits 570 and 516. The natural gas stream in conduit 570 is conducted to fuel gas as required for black start conditions. The natural gas in conduit 516 passes through a valve 626 and then to separator 628 via conduit 517. Separator 628 is operable to remove liquids in the natural gas stream. The removed liquids exit separator 628 via conduit 518 while the substantially liquid free natural gas flows to acid gas removal unit 630 via conduit 519. Acid gas removal unit 630 is operable to remove acid gases (e.g., $CO_2$ and $H_2S$) from the natural gas stream by employing an amine solvent. The removed acid gases exit acid gas removal unit 630 via conduit 520 and are transported to incineration, flare, waste heat exhaust, or sulfur recovery processing. The purified natural gas stream exits acid gas removal system 630 via conduit 521, which carries the natural gas to a mixing means 632 for combination with a water stream in conduit 571. The water stream in conduit 570 and mixing means 632 are added for simulation purposes only in order to ensure adequate water removal capability in downstream equipment. The combined natural gas stream is then conducted via conduit 522 to a cooler 634, wherein the stream is cooled (typically to ambient or cooling water conditions). The cooled stream flows via conduit 523 to a separator 636 that is operable to remove condensed liquids from the cooled natural gas stream. The removed condensed liquids exit separator 636 via conduit 524 and are conducted to waste water treatment or disposal. The substantially liquid free water saturated natural gas from separator 636 is conducted via conduit 525 to second heat exchanger 614 wherein the stream is cooled via indirect heat exchange with the upstream natural gas in conduit 511. The cooled natural gas flows from second heat exchanger 614 to a three phase separator 638. Three phase separator 638 is operable to separate gas, hydrocarbon condensate, and aqueous components, thereby providing an aqueous stream, a hydrocarbon condensate stream, and a liquid free gas stream. The aqueous stream exits three phase separator 638 via conduit 527 and is carried to waste water treatment or disposal. The hydrocarbon condensate stream exits three phase separator 638 via conduit 528 and is carried to mixing means 662. The liquid free gas stream exits 638 via conduit 529 and is carried to a molecular sieve dehydrator 642 for removal of water. The removed water exits dehydrator 642 via conduit 532. The dehydrated natural gas stream is conducted via conduit 533 to a splitter 644. Splitter 644 divides the natural gas stream into three streams exiting through conduits 534, 536, and 537. The natural gas in conduit 536 is carried to sales or fuel gas as required. The natural gas in conduit 534 is carried to first heat exchanger 612 for cooling via indirect heat exchange with the upstream natural gas in conduit 510. The resulting cooled and pretreated natural gas stream exits first heat exchanger 612 via conduit 535 and is carried to the natural gas liquefaction system for further cooling, purification, and/or liquefaction.

The natural gas in conduit 537 (shown to model drier 642 regeneration gas) is conducted to a cooler 646 for cooling and is then carried via conduit 538 to a mixing means 648 for combination with a water stream (shown for simulation purposes only in order to ensure saturated condition) entering via conduit 539. The combined stream is then conducted to a cooler 650 via conduit 540 for further cooling (typically to ambient or cooling water conditions). The cooled stream is then conducted via conduit 541 to a separator 652 for removal of condensed liquids. The removed condensed liquids exit separator 652 via conduit 542 and are carried to waste water treatment or disposal. The substantially liquid free natural gas exits separator 652 via conduit 543, flows through a valve 654, and then to a compressor 656 via conduit 544. The compressed natural gas exits compressor 656 via conduit 545, flows through a valve 658, and is conducted to mixing means 622 via conduit 547 for combination with the natural gas streams in conduits 514 and 558.

In mixing means 662, the primarily liquid streams in conduits 509, 518, and 528 are combined and conducted to a third indirect heat exchanger 664 for heating via indirect heat exchange with the stream in conduit 554. The heated stream is then conducted via conduit 549, through a valve 668, and to three phase separator 670 via conduit 550. Three phase separator 670 is operable to separate gas hydrocarbon condensate, and aqueous components. The condensate and gaseous streams are separated for simulation purposes only to correctly model the downstream conditions. Three phase separator 670 provides an aqueous stream, a hydrocarbon condensate stream, and a gas stream. The aqueous stream exits three phase separator 670 via conduit 551 and is carried to waste water treatment or disposal. The hydrocarbon condensate stream exits three phase separator 670 via conduit 553 and is carried to hydrocarbon stabilizer or condensate stabilizer 672. The gas stream exits three phase separator 670 via conduit 552 and is carried to mixing means 674. Hydrocarbon stabilizer or condensate stabilizer 672 cooperates with an external or internal reboiler 640 to produce a stabilized condensate or combined LPG and condensate stream that is conducted via conduit 554 to third heat exchanger 664 for cooling via indirect heat exchange with the stream in conduit 548. The cooled stream is then conducted via conduit 560 for further cooling in a cooler 666. The stream from cooler 666 is then carried to LPG and NGL separations facilities (not described herein) via conduit 561. The stabilizer overhead gas stream exiting hydrocarbon stabilizer or condensate stabilizer 672 is carried to mixing means 674 via conduit 555 for combination with the stream in conduit 552. The combined stream is conducted via conduit 556 to a compressor 676. The resulting compressed stream exits compressor 676 via conduit 557, is cooled in a cooler 677, and is conducted to mixing means 622 via conduit 558 for combination with the streams in conduits 514 and 547. Hydrocarbon stabilizer 672 conditions are adjusted to remove methane and ethane and to meet downstream NGL sulfur specifications. Generally the temperature in stabilizer 672 should not exceed about 370° F. for fouling and corrosion reasons. Therefore, the pressure in stabilizer 672 was reduced while holding the temperature of reboiler 640 at 370° F. This allowed enough hydrogen sulfide to go overhead to meet LPG and NGL sulfur specifications. Unfortunately, overhead compression via compressor 676 was required to get back into the feedstream upstream of acid gas removal unit 630. Thus, depending on the level of hydrogen sulfide in the feed, overhead compressor 676 may not be necessary because such a low pressure may not be required.

This example clearly illustrates the ability of the process to remove water and acid gases from the natural gas stream, control the temperature and pressure from the natural gas stream within desired ranges, and significantly decrease the overall temperature of the natural gas stream.

What is claimed is:

1. A process for pretreating natural gas for liquefaction, said process comprising the steps of:
   (a) heating a natural gas stream in a first side of a first heat exchanger;
   (b) downstream of the first side of the first heat exchanger, heating the natural gas stream in a first side of a second heat exchanger;
   (c) downstream of the first side of the second heat exchanger, removing an acid gas from the natural gas stream in an acid gas removal system;
   (d) downstream of the acid gas removal system, cooling the natural gas in a second side of the second heat exchanger by indirect heat exchange with the natural gas stream that is heated in step (b);
   (e) downstream of the second side of the second heat exchanger, removing water from the natural gas stream in a first dehydrator; and

TABLE 2

| Conduit # | Vapor Fraction | Temp (° F.) | Press (psia) | $H_2O$ (mol %) | $N_2$ (mol %) | $CO_2$ (mol %) | Methane (mol %) | Ethane (mol %) | Propane (mol %) | $C_4+$ (mol) % |
|---|---|---|---|---|---|---|---|---|---|---|
| 500 | 0.94 | 70 | 2014 | 0.011 | 0.492 | 1.775 | 82.5 | 6.1 | 4.0 | 5.1 |
| 502 | 1.00 | 70 | 2014 | 0.011 | 0.514 | 1.779 | 84.8 | 6.0 | 3.7 | 3.3 |
| 503 | 0.00 | 70 | 2014 | 0.012 | 0.165 | 1.724 | 48.6 | 7.7 | 8.4 | 33.4 |
| 504 | 0.26 | 63 | 1314 | 0.012 | 0.165 | 1.724 | 48.6 | 7.7 | 8.4 | 33.4 |
| 506 | 1.00 | 74 | 2004 | 0.004 | 0.514 | 1.779 | 84.8 | 6.0 | 3.7 | 3.3 |
| 507 | 0.97 | 31 | 1314 | 0.004 | 0.514 | 1.779 | 84.8 | 6.0 | 3.7 | 3.3 |
| 508 | 0.91 | 35 | 1314 | 0.005 | 0.492 | 1.775 | 82.5 | 6.1 | 4.0 | 5.1 |
| 509 | 0.00 | 35 | 1314 | 0.005 | 0.110 | 1.751 | 41.1 | 9.0 | 11.7 | 36.3 |
| 510 | 1.00 | 35 | 1314 | 0.005 | 0.530 | 1.778 | 86.7 | 5.8 | 3.2 | 2.0 |
| 511 | 1.00 | 67 | 1304 | 0.005 | 0.530 | 1.778 | 86.7 | 5.8 | 3.2 | 2.0 |
| 513 | 1.00 | 91 | 1294 | 0.005 | 0.530 | 1.778 | 86.7 | 5.8 | 3.2 | 2.0 |
| 514 | 1.00 | 91 | 1286 | 0.005 | 0.530 | 1.778 | 86.7 | 5.8 | 3.2 | 2.0 |
| 515 | 1.00 | 92 | 1286 | 0.007 | 0.512 | 1.800 | 85.8 | 6.3 | 3.5 | 2.1 |
| 516 | 1.00 | 92 | 1286 | 0.007 | 0.512 | 1.800 | 85.8 | 6.3 | 3.5 | 2.1 |
| 517 | 1.00 | 92 | 1286 | 0.007 | 0.512 | 1.800 | 85.8 | 6.3 | 3.5 | 2.1 |
| 519 | 1.00 | 92 | 1286 | 0.007 | 0.512 | 1.800 | 85.8 | 6.3 | 3.5 | 2.1 |
| 520 | 1.00 | 104 | 682 | 0.000 | 0.000 | 80.298 | 0.4 | 0.0 | 0.0 | 19.3 |
| 521 | 1.00 | 112 | 1280 | 0.007 | 0.523 | 0.006 | 87.7 | 6.5 | 3.6 | 1.7 |
| 522 | 1.00 | 111 | 1280 | 0.099 | 0.523 | 0.006 | 87.6 | 6.5 | 3.6 | 1.7 |
| 523 | 1.00 | 100 | 1275 | 0.099 | 0.523 | 0.006 | 87.6 | 6.5 | 3.6 | 1.7 |
| 525 | 1.00 | 100 | 1275 | 0.099 | 0.523 | 0.006 | 87.6 | 6.5 | 3.6 | 1.7 |
| 526 | 1.00 | 77 | 1270 | 0.099 | 0.523 | 0.006 | 87.6 | 6.5 | 3.6 | 1.7 |
| 527 | 0.00 | 77 | 1270 | 99.999 | 0.001 | 0.000 | 0.0 | 0.0 | 0.0 | 0.0 |
| 529 | 1.00 | 77 | 1270 | 0.052 | 0.523 | 0.006 | 87.7 | 6.5 | 3.6 | 1.7 |
| 533 | 1.00 | 77 | 1250 | 0.000 | 0.523 | 0.006 | 87.7 | 6.5 | 3.6 | 1.7 |
| 534 | 1.00 | 77 | 1251 | 0.000 | 0.523 | 0.006 | 87.7 | 6.5 | 3.6 | 1.7 |
| 535 | 1.00 | 44 | 1246 | 0.000 | 0.523 | 0.006 | 87.7 | 6.5 | 3.6 | 1.7 |
| 537 | 1.00 | 77 | 1250 | 0.000 | 0.523 | 0.006 | 87.7 | 6.5 | 3.6 | 1.7 |
| 538 | 1.00 | 550 | 1240 | 0.000 | 0.523 | 0.006 | 87.7 | 6.5 | 3.6 | 1.7 |
| 540 | 1.00 | 519 | 1240 | 2.058 | 0.513 | 0.006 | 85.9 | 6.3 | 3.5 | 1.7 |
| 541 | 0.98 | 100 | 1235 | 2.058 | 0.513 | 0.006 | 85.9 | 6.3 | 3.5 | 1.7 |
| 543 | 1.00 | 100 | 1235 | 0.105 | 0.523 | 0.006 | 87.6 | 6.5 | 3.6 | 1.7 |
| 544 | 1.00 | 100 | 1235 | 0.105 | 0.523 | 0.006 | 87.6 | 6.5 | 3.6 | 1.7 |
| 545 | 1.00 | 107 | 1291 | 0.105 | 0.523 | 0.006 | 87.6 | 6.5 | 3.6 | 1.7 |
| 547 | 1.00 | 107 | 1286 | 0.105 | 0.523 | 0.006 | 87.6 | 6.5 | 3.6 | 1.7 |
| 548 | 1.00 | 35 | 1270 | 0.005 | 0.511 | 1.792 | 86.8 | 5.8 | 3.2 | 2.0 |
| 549 | 0.11 | 60 | 1260 | 0.005 | 0.110 | 1.751 | 41.1 | 9.0 | 11.7 | 36.3 |
| 550 | 0.43 | 37 | 366 | 0.005 | 0.110 | 1.751 | 41.1 | 9.0 | 5.1 | 43.0 |
| 552 | 1.00 | 37 | 370 | 0.007 | 0.243 | 2.611 | 80.0 | 9.6 | 5.1 | 2.5 |
| 553 | 0.00 | 37 | 370 | 0.003 | 0.011 | 1.114 | 12.3 | 8.6 | 16.6 | 61.4 |
| 554 | 0.00 | 350 | 373 | 0.000 | 0.000 | 0.000 | 0.0 | 0.0 | 16.8 | 83.2 |
| 555 | 1.00 | 97 | 370 | 0.012 | 0.040 | 3.894 | 42.9 | 29.9 | 16.1 | 7.1 |
| 556 | 1.00 | 56 | 370 | 0.009 | 0.186 | 2.968 | 69.7 | 15.3 | 8.1 | 3.8 |
| 557 | 1.00 | 240 | 1296 | 0.009 | 0.186 | 2.968 | 69.7 | 15.3 | 8.1 | 3.8 |
| 558 | 1.00 | 110 | 1286 | 0.009 | 0.186 | 2.968 | 69.7 | 15.3 | 8.1 | 3.8 |
| 560 | 0.00 | 318 | 368 | 0.000 | 0.000 | 0.000 | 0.0 | 0.0 | 16.8 | 83.2 |
| 561 | 0.00 | 160 | 363 | 0.000 | 0.000 | 0.000 | 0.0 | 0.0 | 16.8 | 83.2 |
| 571 | 0.00 | 100 | 1280 | 100.000 | 0.000 | 0.000 | 0.0 | 0.0 | 0.0 | 0.0 |

(f) downstream of the first dehydrator, cooling the natural gas stream in a second side of the first heat exchanger by indirect heat exchange with the natural gas that is heated in step (a).

2. A process according to claim 1; and (g) downstream of the second side of the first heat exchanger, cooling the natural gas stream in a first chiller employing a refrigerant comprising in major portion a hydrocarbon selected from the group consisting of propane, propylene, ethane, ethylene, and combinations thereof.

3. A process according to claim 2; and (h) downstream of the first chiller, using at least a portion of the natural gas stream in an open methane cycle.

4. A process according to claim 1, step (d) including cooling the natural gas stream to a first temperature that is in the range of from about 1 to about 20 degrees above the hydrate temperature of the natural gas stream exiting the second side of the second heat exchanger.

5. A process according to claim 4, step (f) including cooling the natural gas stream to a second temperature that is below the hydrate temperature of the natural gas stream exiting the second side of the second heat exchanger.

6. A process according to claim 5, said first dehydrator being a molecular sieve dehydrator.

7. A process according to claim 6, said first temperature being within 10 degrees of the hydrate temperature of the natural gas stream exiting the second side of the second heat exchanger.

8. A process according to claim 7; and (i) upstream of the first side of the first heat exchanger, removing water from the natural gas stream in a second dehydrator, said second dehydrator being a glycol dehydrator.

9. A process according to claim 1; and (j) upstream of the first side of the first heat exchanger, reducing the pressure of the natural gas stream in an expander.

10. A process according to claim 9; and (k) simultaneously with step (j), extracting energy from the expander.

11. A process according to claim 10; and (l) downstream of the expander and upstream of the first side of the first heat exchanger, removing liquids from the natural gas stream.

12. A process according to claim 1, said removing of the acid gas in step (c) causing heating of the natural gas stream.

13. A process according to claim 12, said acid gas removal system employing an amine solvent to remove the acid gas from the natural gas stream.

14. A process according to claim 1; and (m) vaporizing liquefied natural gas produced via steps (a)–(f).

15. A process of pretreating natural gas for liquefaction, said process comprising the steps of:

(a) reducing the pressure of a natural gas stream in an expander;

(b) downstream of the expander, removing liquids from the natural gas stream in a first gas-liquid separator; and (c) downstream of the first gas-liquid separator, cooling the natural gas stream in a first chiller employing a refrigerant comprising in major portion a hydrocarbon selected from the group consisting of propane, propylene, ethane, ethylene, and combinations thereof.

16. A process according to claim 15; and (d) downstream of the expander and upstream of the first chiller, removing water from the natural gas stream in a first dehydrator.

17. A process according to claim 16; and (e) upstream of the expander, removing water from the natural gas stream in a second dehydrator.

18. A process according to claim 17, said first dehydrator being a molecular sieve dehydrator, said second dehydrator being a glycol dehydrator.

19. A process according to claim 15; and (f) downstream of the first chiller, using at least a portion of the natural gas stream in an open methane cycle.

20. A process according to claim 15; and (g) simultaneously with step (a), extracting energy from the expander.

21. A process according to claim 15; and (h) downstream of the expander and upstream of the first chiller, removing an acid gas from the natural gas stream in an acid gas removal system.

22. A process according to claim 21; and (i) downstream of the expander and upstream of the acid gas removal system, heating the natural gas stream in a first side of a first heat exchanger.

23. A process according to claim 22; and (j) downstream of the acid gas removal system and upstream of the first chiller, cooling the natural gas stream in a second side of the first heat exchanger by indirect heat exchange with the natural gas stream heated in step (i).

24. A process according to claim 23; and (k) downstream of the first side of the first heat exchanger and upstream of the acid gas removal system, heating the natural gas stream in a first side of a second heat exchanger.

25. A process according to claim 24; and (l) downstream of the acid gas removal system and upstream of the second side of the first heat exchanger, cooling the natural gas stream in a second side of the second heat exchanger by indirect heat exchange with the natural gas stream heated in step (k).

26. A process according to claim 25; and (m) downstream of the second side of the second heat exchanger and upstream of the second side of the first heat exchanger, removing water from the natural gas stream in a dehydrator.

27. A process according to claim 15, said reducing of the pressure of step (a) causing cooling of the natural gas stream.

28. A process according to claim 27, said reducing of pressure of step (a) causing liquids to condense in the natural gas stream, said liquids being substantially removed from the natural gas stream in step (b).

29. A process according to claim 15; and (n) vaporizing liquefied natural gas produced via steps (a)–(c).

30. A process of pretreating natural gas for liquefaction, said process comprising the steps of:

(a) removing water from a natural gas stream in a first dehydrator;

(b) downstream of the first dehydrator, reducing the pressure of the natural gas stream in an expander;

(c) downstream of the expander, removing liquids from the natural gas stream in a first gas-liquid separator;

(d) downstream of the first gas-liquid separator, heating the natural gas stream in a first side of a first heat exchanger;

(e) downstream of the first side of the first heat exchanger, heating the natural gas stream in a first side of a second heat exchanger;

(f) downstream of the first side of the second heat exchanger, removing an acid gas from the natural gas in an acid gas removal system;

(g) downstream the acid gas removal system, cooling the natural gas in a second side of the second heat exchanger;

(h) downstream of the second side of the second heat exchanger, removing liquids from the natural gas stream in a second gas-liquid separator;

(i) downstream of the second gas-liquid separator, removing water from the natural gas stream in a second dehydrator; and (j) downstream of the second dehydrator, cooling the natural gas stream in a second side of the first heat exchanger.

31. A process according to claim 30, steps (d) and (j) including transferring heat from the natural gas stream in the second side of the first heat exchanger to the natural gas stream in the first side of the first heat exchanger, steps (e) and (g) including transferring heat from the natural gas stream in the second side of the second heat exchanger to the natural gas stream in the first side of the first heat exchanger.

32. A process according to claim 30; and (k) downstream of the second side of the first heat exchanger, cooling the natural gas in a first chiller employing a refrigerant comprising in major portion a hydrocarbon selected from the group consisting of propane, propylene, ethane, ethylene, and combinations thereof.

33. A process according to claim 32; and (l) downstream of the first chiller, using at least a portion of the natural gas stream in an open methane cycle.

34. A process according to claim 30; and (m) extracting energy from the expander.

35. A process according to claim 30, said removing of the acid gas of step (f) causing heating of the natural gas stream.

36. A process according to claim 30, said acid gas removal system employing an amine solvent to remove the acid gas from the natural gas stream.

37. A process according to claim 30, said reducing of the pressure of the natural gas stream of step (b) causing cooling of the natural gas stream.

38. A process according to claim 30, said reducing of the pressure of the natural gas stream of step (b) causing liquids to condense in the natural gas stream, said liquids condensed in step (b) being substantially removed in step (c).

39. A process according to claim 30, said first dehydrator being a glycol dehydrator, said second dehydrator being a molecular sieve dehydrator.

40. A process according to claim 30; and (n) vaporizing liquefied natural gas produced via steps (a)–(j).

41. An apparatus for pretreating natural gas prior to liquefaction, said apparatus comprising:

an expander for reducing the pressure of natural gas, said expander having an expander inlet and an expander outlet;

a first heat exchanger defining a first fluid flow path and a second fluid flow path, said first heat exchanger defining first and second flow path inlets and outlets for the first and second fluid flow paths respectively, said first heat exchanger being operable to facilitate indirect heat exchange between natural gas flowing through the first fluid flow path and natural gas flowing through the second fluid flow path, said first flow path inlet being fluidly coupled to the expander outlet; and an acid gas removal system having an inlet and outlet, said acid gas removal system inlet being fluidly coupled to the first flow path outlet, said acid gas removal system outlet being fluidly coupled to the second flow path inlet.

42. An apparatus according to claim 41; and a methane economizer fluidly coupled to the second flow path outlet.

43. An apparatus according to claim 42; and an ethylene chiller fluidly disposed between the second flow path outlet and the methane economizer.

44. An apparatus according to claim 43; and a propane chiller fluidly disposed between the second flow path outlet and the ethylene chiller.

45. An apparatus according to claim 41, said expander being operable to generate energy that can be employed elsewhere in the apparatus.

46. An apparatus according to claim 45, said energy being in the form of mechanical energy, hydraulic energy, or electrical energy.

47. An apparatus according to claim 41, said acid gas removal system employing an amine solvent.

48. An apparatus according to claim 41; and a gas-liquid separator fluidly disposed between the expander outlet and the first flow path inlet.

49. An apparatus according to claim 41; and a first dehydrator fluidly disposed between the acid gas removal system and the second flow path inlet.

50. An apparatus according to claim 49; and a second dehydrator fluidly coupled to the expander inlet.

51. An apparatus according to claim 50, said first dehydrator being a molecular sieve dehydrator, said second dehydrator being a glycol dehydrator.

52. An apparatus according to claim 41; and a second heat exchanger defining a third fluid flow path and a fourth fluid flow path, said second heat exchanger being operable to facilitate indirect heat exchange between natural gas flowing through the third fluid flow path and natural gas flowing through the fourth fluid flow path, said third fluid flow path being fluidly disposed between the first flow path outlet and the acid gas removal system inlet, said fourth fluid flow path being fluidly disposed between the acid gas removal system outlet and the second flow path inlet.

* * * * *